(12) United States Patent
Branson et al.

(10) Patent No.: US 7,578,291 B2
(45) Date of Patent: Aug. 25, 2009

(54) CLOSED COOKING SYSTEM

(76) Inventors: Michael Branson, 5265 Hwy. 30 South, New Plymouth, ID (US) 83655; Jaylene Branson, 5265 Hwy. 30 South, New Plymouth, ID (US) 83655

(*) Notice: Subject to any disclaimer, the term of this patent is extended or adjusted under 35 U.S.C. 154(b) by 189 days.

(21) Appl. No.: 11/563,238

(22) Filed: Nov. 27, 2006

(65) Prior Publication Data

US 2008/0121222 A1    May 29, 2008

(51) Int. Cl.
*F24C 1/16*    (2006.01)
(52) U.S. Cl. .................. 126/274; 126/9 R; 126/38; 126/25 B; 126/25 R
(58) Field of Classification Search ............... 126/274, 126/9 R, 138, 25 R, 25 B, 41 R
See application file for complete search history.

(56) References Cited

U.S. PATENT DOCUMENTS

| 3,851,639 | A | * | 12/1974 | Beddoe ............... 126/25 R |
|---|---|---|---|---|
| 4,008,996 | A | | 2/1977 | Wells |
| 4,077,387 | A | | 3/1978 | Bateman |
| 4,185,748 | A | | 1/1980 | Vache et al. |
| 4,348,948 | A | | 9/1982 | Allison |
| 4,528,975 | A | | 7/1985 | Wang |
| 4,903,683 | A | | 2/1990 | Larsen et al. |
| 4,909,235 | A | | 3/1990 | Boetcker |
| 5,218,950 | A | * | 6/1993 | Hait ........................ 126/9 R |
| 5,437,222 | A | * | 8/1995 | Franklin .................... 99/450 |
| 5,473,979 | A | | 12/1995 | Ruben |
| 5,611,264 | A | | 3/1997 | Studer |
| 5,797,386 | A | * | 8/1998 | Orr ........................ 126/25 R |
| 5,979,431 | A | | 11/1999 | Hamilton et al. |
| 6,076,451 | A | | 6/2000 | Studer |
| 6,314,955 | B1 | | 11/2001 | Boetcker |
| 6,543,435 | B1 | | 4/2003 | Regen et al. |
| 6,945,243 | B1 | | 9/2005 | Walker et al. |
| 7,025,589 | B2 | | 4/2006 | Werz |
| 2004/0000303 | A1 | | 1/2004 | Regen et al. |
| 2004/0123857 | A1 | | 7/2004 | Viraldo |
| 2006/0060181 | A1 | | 3/2006 | Sasaki et al. |
| 2007/0199555 | A1 | * | 8/2007 | Gregory .................. 126/9 R |

* cited by examiner

*Primary Examiner*—Steven B McAllister
*Assistant Examiner*—Nikhil Mashruwala
(74) *Attorney, Agent, or Firm*—Elizabeth H. Schierman; Dykas, Shaver & Nipper, LLP

(57) ABSTRACT

A system and device for storing, transporting and cooking meals in circumstances where open flame is restricted. The system and device provides a container with a removable lid that allows for the storage and use of cooking vessels and heating elements in a closed environment. This situation allows heat to be created and transferred to a cooking vessel while containing the heat and related items in a closed container. Preferably the system and device is utilized with Dutch ovens and charcoal briquettes.

18 Claims, 7 Drawing Sheets

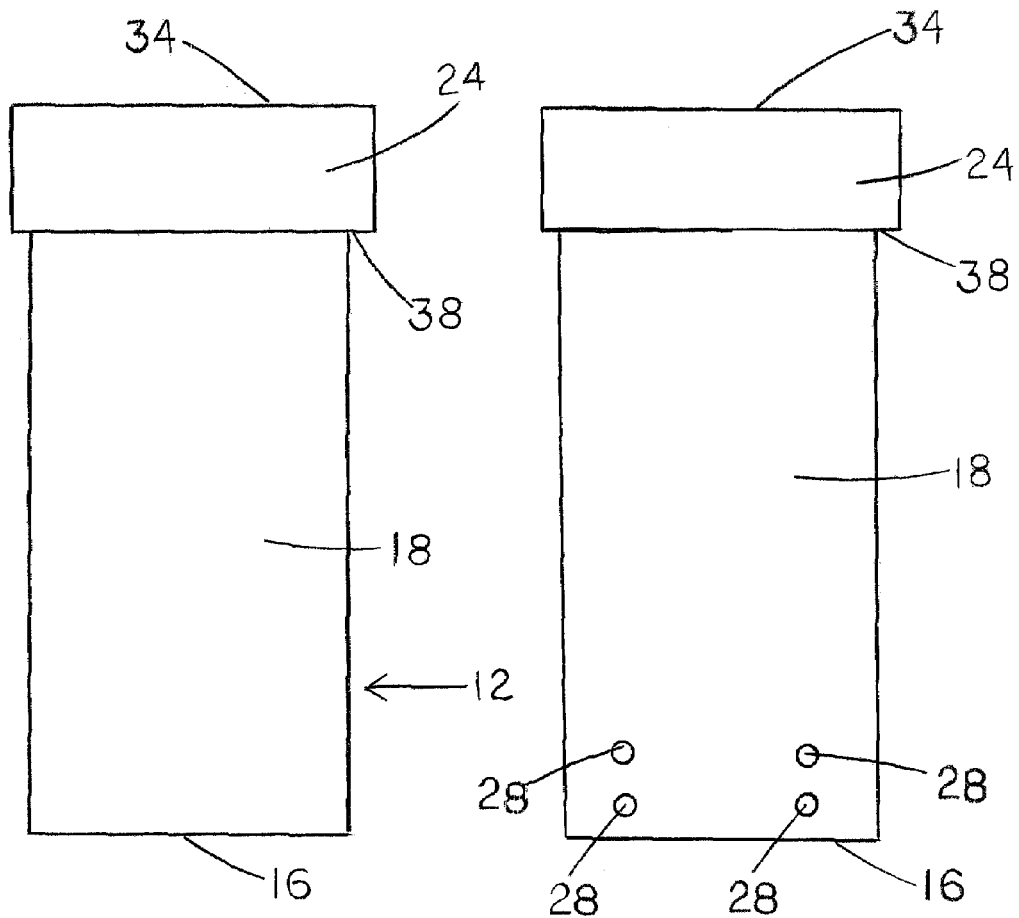

CLOSED COOKING SYSTEM

FIELD OF THE INVENTION

The present invention generally relates to an apparatus for Dutch oven cooking, and more particularly to a system and device for performing Dutch oven cooking in applications where open fires are prohibited.

BACKGROUND OF THE INVENTION

Outdoor cooking has gained tremendous popularity, particularly among parties in rural areas of the American West. Due to a variety of factors, one of these types of cooking that has proven to be tremendously popular is what is known as "Dutch oven" cooking.

In Dutch oven cooking, a party who desires to prepare a meal places the meal within a large, covered, typically metal (cast iron), container called a Dutch oven. These containers are specially designed so as to allow heat to be dissipated evenly throughout the containers and so as to allow a meal to be cooked. Heat is imparted to a Dutch oven typically through the use of a hot piece of combusting material such as a piece of charcoal or a hot wood ember. Depending upon the circumstances, a variety of other types of heating materials may also be utilized. Dutch ovens provide a simple, straightforward and effective way to bake items while outdoors, and thus provides a user the ability to prepare a wider variety of foods than those that are traditionally made available in such settings.

However, one problem that takes place in such an environment is that fire is generally utilized to create the cooking embers. In some particular instances an open flame cannot be utilized when a burn ban is in effect. Another problem that exists in the prior art is that use of these Dutch ovens requires that a variety of other pieces of equipment also be utilized in conjunction with these devices. These additional pieces of equipment include charcoal starter chimneys, devices for carrying and storing these ovens, and devices for handling these hot ovens. Storage of such devices and combinations thereof are typically reserved to devices that carry an individual oven or a large wooden box that can carry several ovens. However, when not in use, these large containers are in many instances so large and awkward so as to prevent their meaningful usage, and become troublesome to a user.

What is needed therefore is a device that allows for the easy transport and use of Dutch ovens in a variety of circumstances. What is also needed is a device for storing the various items related to outdoor and Dutch oven cooking. What is also needed is a device that provides a safe closed system for Dutch oven cooking. Embodiments of the present invention meets these needs and provides these advantages.

SUMMARY OF THE INVENTION

The present invention is a system and device for storing, transporting and cooking with a Dutch oven even in circumstances where open flame is not permitted. One embodiment of the present invention provides a closed container that allows for the storage and use of Dutch ovens in a variety of circumstances because the Dutch ovens are held within a closed mobile cooking environment. Other embodiments of the present invention may be operated with the lid off, thereby creating an "open" cooking environment.

The system of the present invention is made up of an outer container having a top and a bottom, and a circumvolving outer wall. This container defines a chamber inside of the container. This chamber is shaped so as to receive at least one cooking vessel, preferably a Dutch oven, within the chamber. A cooking vessel, preferably a Dutch oven, is configured for placement within the chamber. A heating device, preferably a burning charcoal briquette, is also configured for placement within the device. This allows heat to be transferred to the cooking vessel. While the preferred embodiment of the invention will be described in this application it is to be distinctly understood that the invention is not limited thereto, but is intended to include all modifications and embodiments that are within the scope of the broadest interpretation of the claims of the invention.

In the preferred embodiment of the invention the container contains a floor suspended above the bottom of the container which is preferably closed. A variety of apertures are positioned above and below this floor as to allow better air flow and heat regulation within the chamber. The top of the chamber is preferably open so as to allow generally vertical access to the inner portions of the container. A removable lid is configured for placement over the open-ended top of the container.

In the preferred embodiment of the invention, this removable lid has a closed top portion, an open bottom portion and sides that surround the closed top. This configuration defines a lid chamber, which is divided by a grate or mesh plate that is positioned at approximately one half of the depth of the container.

In some embodiments of the invention, a ring is placed on this grate on the side of the grate that is positioned nearest to the internal portions of the container. This ring is configured to hold charcoal briquettes when the lid in placed on its top in an inverted position. In this position, the device can be utilized to heat the briquettes. All of the ash and debris that comes from heating the briquettes are collected in the lid and none of this material leaves this system.

In use the present invention can be utilized first by removing the closed top lid, and utilizing the inverted lid to light a preselected number of charcoal briquettes. In this, the use of the supplied ring may be utilized.

Once these charcoal briquettes are appropriately ignited, a pre-designated number of these items are placed upon the floor which is suspended above the bottom of the container. A Dutch oven of a preselected size, containing a preselected meal is then placed upon these coals. More charcoal briquettes, or other types of heated embers or elements may then be placed on the lid of this Dutch oven. A number of Dutch ovens containing various ingredients may then be systematically stacked within the chamber. When the container is filled, or when the preselected number of Dutch ovens has been reached, the lid can be replaced over the container so as to hold the heat in the device, or the lid can be left off.

After a predesignated cooking time has passed, the lid of the device can be removed and the Dutch ovens extricated from the chamber. In as much as complete combustion of the charcoal briquettes causes these to be reduced to ash, all of this ash can be stored in the bottom of the container on top of the floor. After cooking, the Dutch ovens can be returned to the container and the entire container transported as a single unit.

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out our invention. As will be realized, the invention is capable of modification in various obvious respects all without departing from the invention. Accordingly, the drawings and description of the preferred embodiments are to be regarded as illustrative in nature, and not as restrictive in nature.

BRIEF DESCRIPTION OF THE DRAWINGS

FIG. 4 shows a (partial) perspective view of the embodiment of FIG. 1 showing the lid of the present invention in an inverted position with a ring for lighting charcoal briquettes connected there-to.

FIG. 9 shows a third side plan view of the embodiment of FIG. 1.

FIG. 10 shows a fourth side plan view of the embodiment of FIG. 1.

DESCRIPTION OF THE PREFERRED EMBODIMENTS

Figure 1:
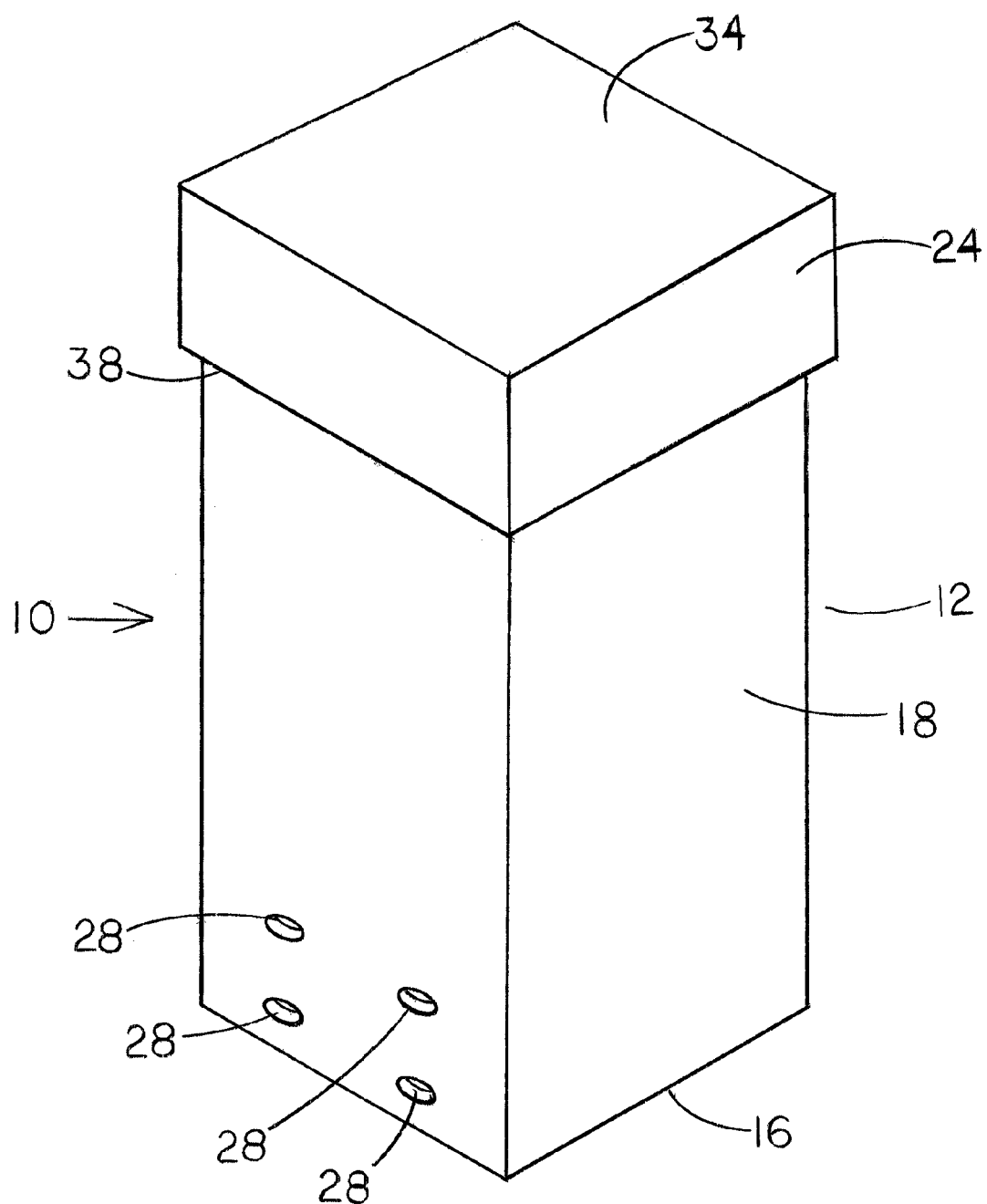
FIG. 1 shows a perspective representational view of the preferred embodiment of the invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention is a system and device for storing, transporting and cooking food with a Dutch oven under a variety of circumstances, including those circumstances where the use of an open flame is restricted. Referring now to FIGS. 1-10, a variety of views of the preferred embodiment of the present invention are shown.

Figure 2:
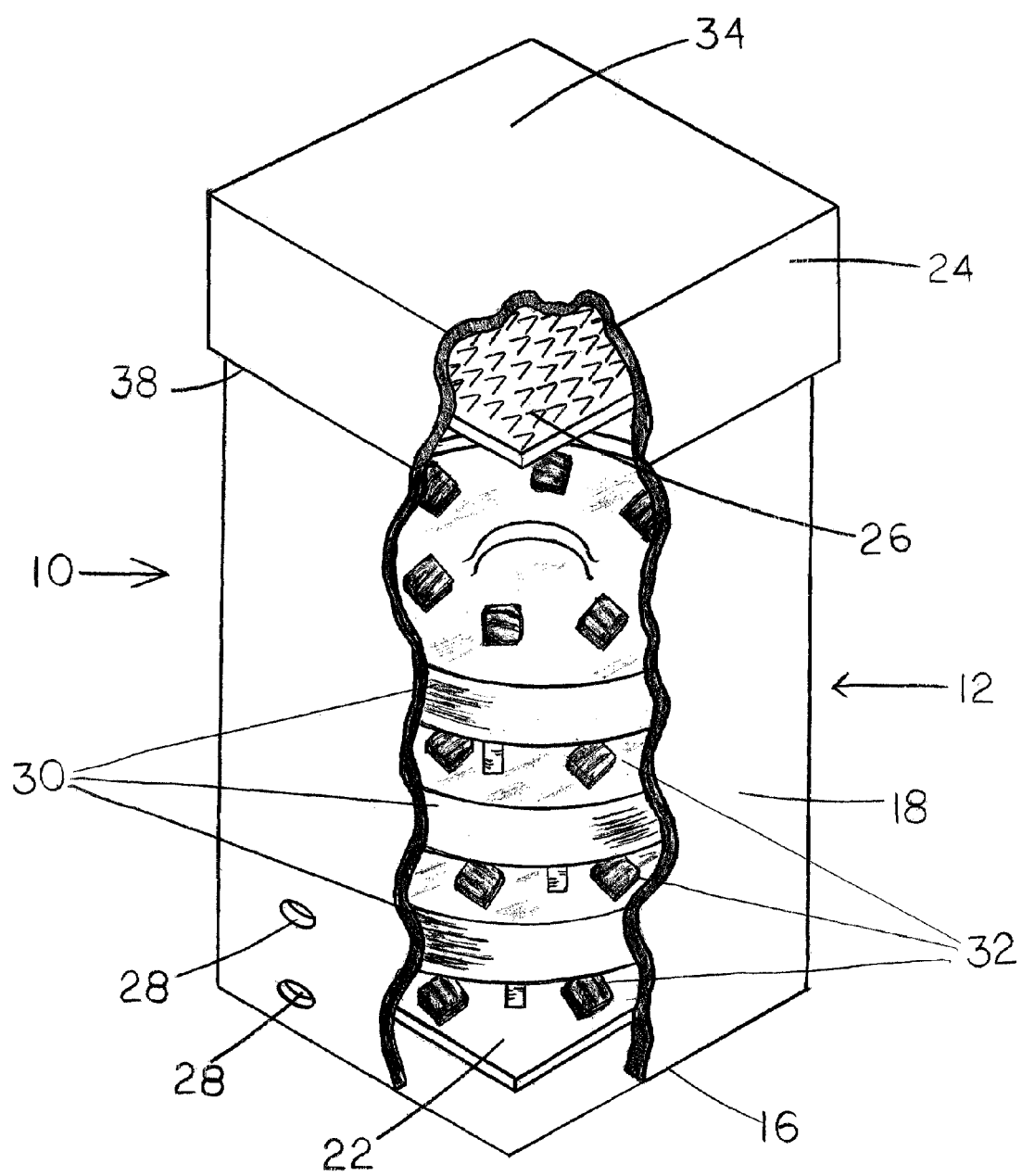
FIG. 2 shows a cut away perspective representational view of the preferred embodiment of FIG. 1, with Dutch ovens with briquettes placed in side.
Figure 3:
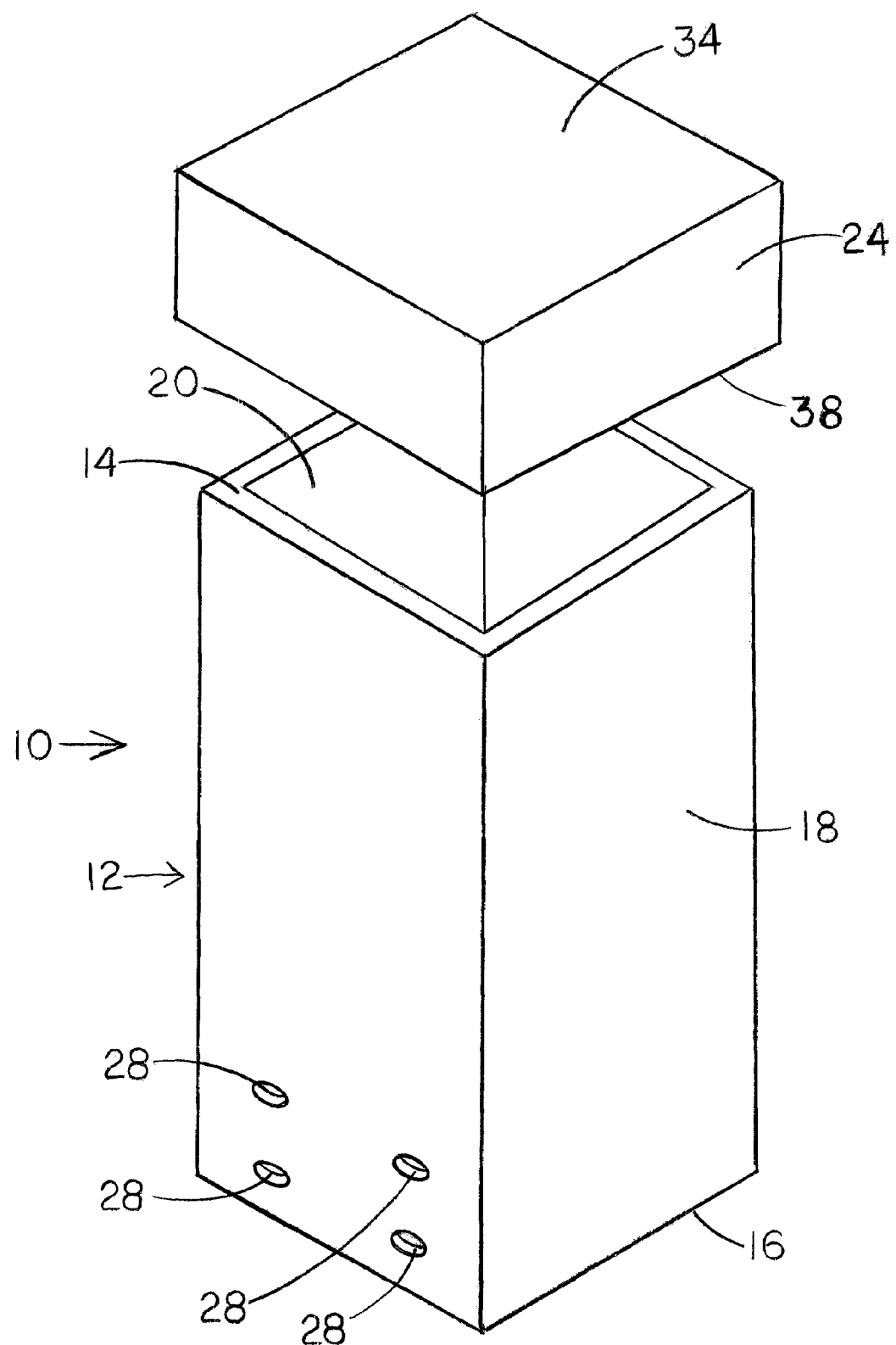
FIG. 3 shows an exploded perspective front plan view of embodiment of FIG. 1.

The Figures show an outer container 12, this container 12 has an open top 14, a closed bottom 16 and a circumvolving wall 18 that interconnects the top 14 and the bottom 16. This container 12 defines a chamber 20, wherein cooking vessels 30 of a preselected size and appropriate heating devices 32 can be placed. A cut away view of these features is shown in FIG. 2. In this embodiment of the invention, a replaceable lid 24 having a lid top 34 and an open lid bottom 38 is included and utilized to hold heat within the chamber, if so desired. It is preferred that the outer chamber 12 be manufactured of metal, including but not limited to steel or aluminum.

In the preferred embodiment of the invention shown is in these figures, the chamber 20 includes a floor 22, which is suspended above the bottom 16. It is preferred that this floor be located at least four inches above the bottom 16 of the chamber 20 and be ventilated with at least two holes 28. In the embodiment shown in the figures, the floor being generally centered between the top holes and the bottom holes so that the top holes supply air (oxygen) to the charcoal (32) and the bottom holes ventilate the lower chamber (defined in the chamber, between the bottom 16 and the floor 22). The bottom chamber being ventilated so as to prevent the bottom 16 of the chamber from becoming too warm and damaging (starting a fire) the surface upon which the present invention is used.

The dimensions of the chamber can vary according to the respective needs and necessities of the user, however in this preferred embodiment of the invention the device is configured to allow stacking of a Dutch oven consistent with the traditional use of these types of cooking vessels.

This removable lid 24 is configured for placement over the open top 14 of the container 12. This removable lid 24 contains a divider 26 preferably made from a material that contains a variety of apertures such as a grate or mesh portion, preferably made of expanded metal. In the preferred embodiment of the invention, this divider 26 is placed approximately mid way between the portion of the lid 24 that passes over the top 14 of the container 12 and the closed top portion of the lid 34.

In the preferred embodiment of the invention, the invention has four generally flat sides (the circumvolving wall 18) that are interconnected at their edges and corners. While this shape is shown and described as the preferred embodiment of the invention, it is to be distinctly understood that the invention is not limited thereto but may be variously configured according to the other various needs and necessities of a user. A variety of other shapes are also contemplated including generally round, cornerless cylinders as well as octagonal, heaxagonal, decagonal cylinders and other types of shapes that are consistent with the shape, function, and purpose of the present invention.

Within these walls, a plurality of vents 28 are defined. These vents 28 are positioned in the walls so as to allow the flow of air into the chamber 20. This flow of air can be utilized to regulate a variety of features. This flow of air can be utilized to regulate the temperature of the bottom 16 of the chamber by cooling. The flow of air can also be utilized to regulate the rates of combustion of the heating elements 32, which can thereby affect the cooking times of the materials within the cooking vessels 30. This regulation of airflow may take place in various forms, including opening and closing various apertures (vents) so that the flow of air is altered like a damper.

Depending upon the exact necessities of the user, various modifications to this basic idea may take place.

Figure 4:
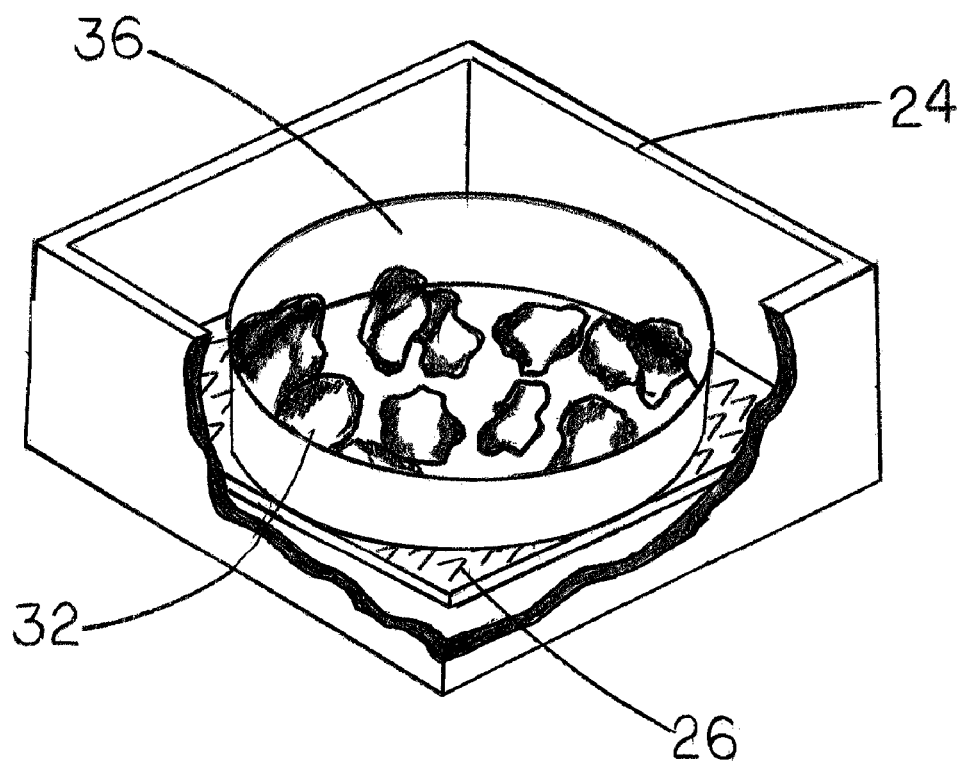
Figure 5:
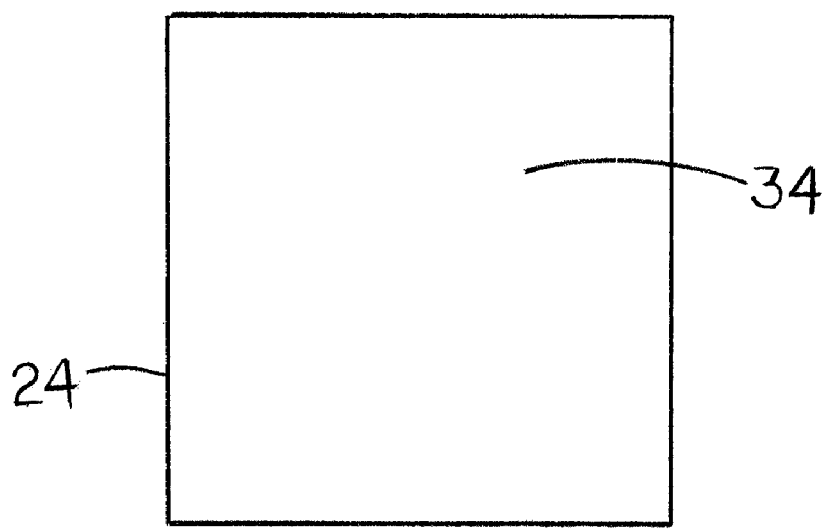
FIG. 5 shows a top plan view of the embodiment of FIG. 1.
Figure 6:
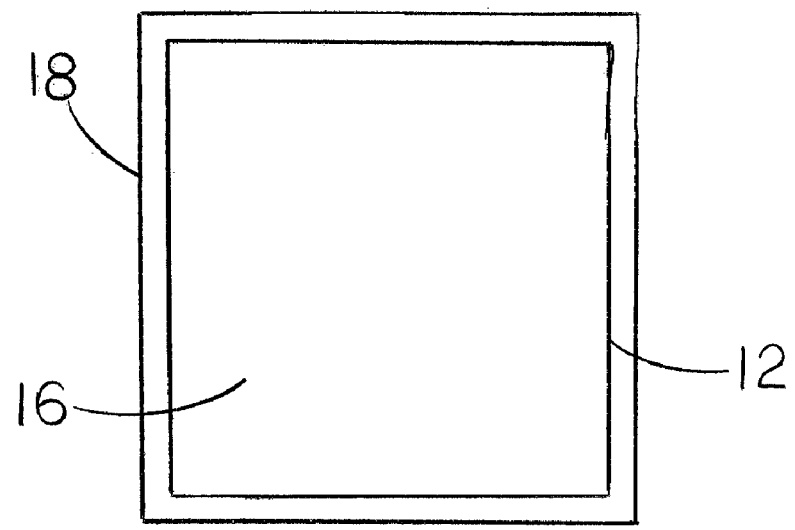
FIG. 6 shows a bottom side plan view of the embodiment of FIG. 1.
Figure 7:
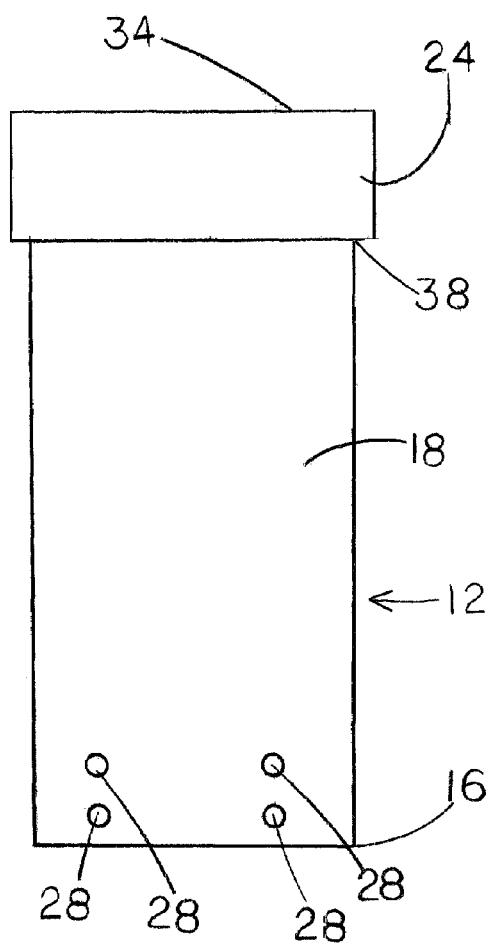
FIG. 7 shows a first side plan view of the embodiment of FIG. 1.
Figure 8:
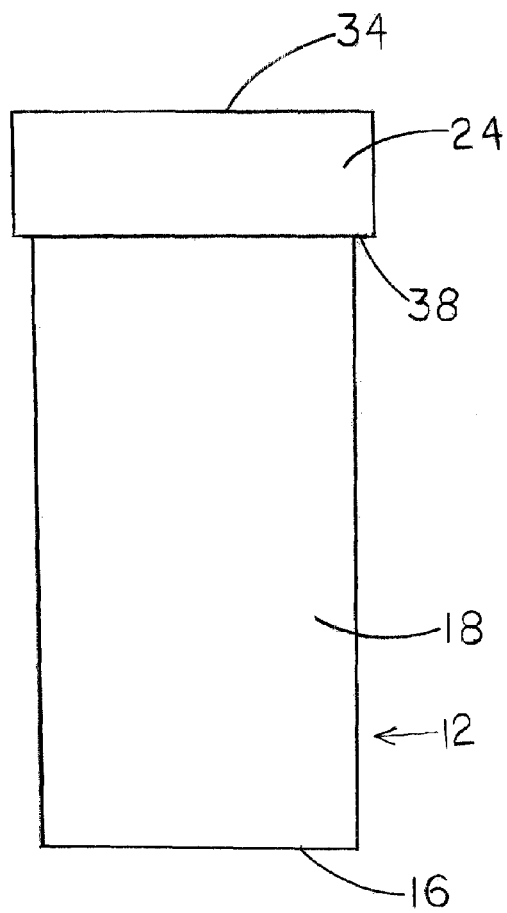
FIG. 8 shows a second side plan view of the embodiment of FIG. 1.

Referring now to FIG. 4, a partial perspective view of another feature of the present invention is shown. In some embodiments of the invention, a ring 36 is also included as part of this invention. This ring 30 is configured to hold charcoal briquettes 32 (or other heating element) in a tight grouping so as to better accomplish the task of lighting these briquettes. Preferably this is done by inverting the lid 24 so as to expose the grate divider 26, which is placed within the lid. The ring 36 is then placed upon this divider 26, briquettes are then added into this ring 36, and the briquettes are then lit according to any of the generally known and acceptable methods for doing so. The lid 24 collects any debris that may fall from the burning of the briquettes 32. When the briquettes 32 are sufficiently ignited they can be separated and utilized within the system in the manner desired by the user. Depending upon the needs of the user, the shape, placement, configuration and connection of the ring 30 to other portions of the container 10 can all be modified and varied.

FIG. 2 shows a cut away view of the present invention in use. After lighting the briquettes 32 according to the manner described above, these briquettes 32 are allowed to burn until a designated amount of combustion has taken place. These briquettes 32 can then be removed from the ring and placed within the container.

Once these charcoal briquettes are appropriately ignited, a pre-designated number of these items are placed upon the floor 22 which is suspended above the bottom 16 of the container 12. A Dutch oven of a preselected size and containing a preselected meal is then placed upon these coals 32. More charcoal briquettes or other types of heated embers or elements 32 may then be placed on the lid of this Dutch oven. A number of Dutch ovens containing various ingredients may then be systematically stacked within the chamber. When the container is filled, or when the preselected number of Dutch ovens have been reached, the lid 24 can be replaced over the container 12 so as to hold the heat in the chamber 20, if so desired.

After a predesignated cooking time has passed, the lid 24 of the device can be removed and the Dutch ovens extricated from the chamber 20. In as much as complete combustion of the charcoal briquettes causes these to be reduced to ash, all of this ash can be stored in the bottom of the container on top of the floor. After cooking, the Dutch ovens can be returned to the container 12 and the entire container 12 transported as a single unit.

The exemplary embodiments shown in the figures and described above illustrate, but do not limit the invention. It should be understood that there is no intention to limit the invention to the specific form disclosed; rather, the invention is to cover all modifications, alternative constructions, and equivalents falling within the spirit and scope of the invention as defined in the claims. For example, while the exemplary embodiments illustrate the use of the invention as utilizing Dutch ovens and charcoal briquettes, the invention is not limited to use with these items and may be used with other cooking vessels and heating devices.

While there is shown and described, the present preferred embodiment of the invention, it is to be distinctly understood that this invention is not limited thereto, but may be variously embodied to practice within the scope of the following claims. From the foregoing description, it will be apparent that various changes may be made without departing from the spirit and scope of the invention as defined by the following claims.

What is claimed is:

1. A system for mobile cooking comprising:
    an outer container having a top, a removable lid, and a bottom, and a circumvolving outer wall interconnecting said top and said bottom, said container defining a chamber therein, said chamber configured to receive at least one cooking vessel therein, said top being open, said removable lid being configured for placement over said open top, said removable lid comprising a divider, said divider separating two portions of said removable lid, and said divider defining a plurality of apertures within said divider;
    at least one cooking vessel configured for placement within said chamber; and
    a plurality of heating devices that provide heat to said cooking vessel, within said chamber;
    said cooking vessel being configured to enclose food during cooking, said cooking vessel comprising a vessel lid configured to receive thereon at least one of said heating devices;
    said removable lid being configured to receive upon said divider said heating devices and to support said heating devices during heating of said heating devices;
    said removable lid being further configured to receive therein and to hold remnants of said heating devices following at least partial combustion of said heating devices;
    wherein said cooking vessel is configured to be heated from below, above, or both below and above as desired according to placement of said heating devices within said outer container.

2. The system of claim 1 wherein said container contains a floor suspended above said bottom; said floor being configured to support said remnants of said heating devices following at least partial combustions of said heating devices during post-cooking transportation of said system.

3. The system of claim 1 wherein said circumvolving outer wall defines at least one vent hole there in.

4. The system of claim 3 wherein said circumvolving outer wall defines at least one vent hole above said floor and at least one vent hole below said floor.

5. The system of claim 1 wherein said divider is a grate made from expanded metal.

6. The system of claim 5 wherein said outer container is generally box shaped.

7. The system of claim 5 wherein said outer container is generally cylindrical in shape.

8. The system of claim 1 wherein said heating device is at least one hot charcoal briquette.

9. The system of claim 1 wherein said cooking vessel is a Dutch oven.

10. The system of claim 9 wherein said container is configured to allow Dutch ovens of a preselected size to be stacked and held in a generally stable configuration within said chamber.

11. The system of claim 10 wherein said container is configured to allow heating devices to be stacked upon and between said Dutch oven cooking devices.

12. The system of claim 11 wherein said outer container is made of metal.

13. The system of claim 1, wherein said removable lid is further configured to receive therein a ring for holding charcoal briquettes.

14. The system of claim 13, wherein said ring is configured for placement upon said divider.

15. The system of claim 14 wherein said ring is configured for use with said divider.

16. The system of claim 14 wherein said lid has a closed top and an open bottom and wherein said grated divider is located midway between the closed top and the open bottom.

17. A system for mobile cooking and transporting cooking equipment, said system comprising:
    an outer container having an open top, a bottom, and a circumvolving outer wall interconnecting said top and said bottom, said container defining a chamber therein, said chamber configured to receive at least one iron cooking vessel therein, said circumvolving outer wall defining at least one vent hole therein;
    a floor suspended above said bottom, said floor being attached to said circumvolving outer wall;

a removable lid configured for placement over said open top, said removable lid comprising a divider, said divider separating two portions of said removable lid, said divider defining a plurality of apertures within said divider;

at least one iron cooking vessel configured for placement within said chamber; and a plurality of heating devices, said heating devices providing a source of heat to said at least one iron cooking vessel, said heating device configured for placement within said chamber;

said iron cooking vessel being configured to enclose food during cooking, said iron cooking vessel comprising a vessel lid configured to receive thereon at least one of said heating devices;

said removable lid being configured to receive upon said divider said heating devices and to support said heating devices during heating of said heating devices;

said removable lid being further configured to receive therein and to hold remnants of said heating devices following at least partial combustion of said heating devices;

wherein each of said iron cooking vessels is configured to be heated from below, above, or both below and above as desired according to placement of said heating devices within said outer container.

18. A system for transporting Dutch ovens, for mobile cooking, and for transporting hot Dutch ovens and the remnants of used briquettes, said system comprising;

an outer container having an open top, a bottom, a circumvolving outer wall interconnecting said top and said bottom, and a floor suspended above said bottom and attached to said circumvolving outer wall, said circumvolving outer wall defining at least one vent hole above said floor and at least one vent hole below said floor, said container defining a chamber therein, said chamber configured to receive a plurality of Dutch ovens therein and to hold said plurality of Dutch ovens in a generally stable stacked configuration;

at least one Dutch oven configured for placement within said chamber, each of said Dutch ovens being configured to enclose food during cooking, each of said Dutch ovens comprising a vessel lid configured to receive thereon at least one briquette; and a subsystem for heating said briquettes, said subsystem comprising:

a removable lid configured for placement over said open top, said removable lid comprising a divider, said divider separating two portions of said lid, said divider defining a plurality of apertures within said divider; and a ring configured for placement on said divider and configured for holding at least one briquette while said briquette is ignited;

said removable lid configured to receive upon said divider and within said ring said briquettes and to support said briquettes during ignition of said briquettes;

said removable lid being further configured to receive therein and to hold remnants of said briquettes following at least partial combustion of said briquettes;

wherein each of said Dutch ovens is configured to be heated from below, above, or both below and above as desired according to placement of said briquettes within said outer container.

* * * * *